United States Patent [19]

Carpenter et al.

[11] Patent Number: 4,993,287
[45] Date of Patent: Feb. 19, 1991

[54] AUTOMATED WIRE INSULATION CUTTER AND STRIPPER

[75] Inventors: Thomas S. Carpenter, Cazenovia; Arthur C. Goldsmith, Lafayette, both of N.Y.

[73] Assignee: Carpenter Manufacturing Co., Inc., Manlius, N.Y.

[21] Appl. No.: 318,672

[22] Filed: Mar. 3, 1989

[51] Int. Cl.⁵ ............................................. H02G 1/12
[52] U.S. Cl. ...................................................... 81/9.51
[58] Field of Search .......................................... 81/9.51

[56] References Cited

U.S. PATENT DOCUMENTS 3,630,105 12/1971 Rider ..................................... 81/9.51
4,352,305 10/1982 Rodenbeck ........................... 81/9.51
4,745,828 5/1988 Stepan .................................. 81/9.51

FOREIGN PATENT DOCUMENTS 1434464 5/1976 United Kingdom ................. 81/9.51

Primary Examiner—James G. Smith
Attorney, Agent, or Firm—Charles S. McGuire

[57] ABSTRACT

A rotary blade wire insulation cutting and stripping machine includes a pair of linear actuators respectively controlling the length and the depth of cuts in accordance with keyboard inputs to a microprocessor. The cutter blades are initially positioned with their cutting edges in mutual contact and provide the stop for wire insertion. The gripping jaws which hold the wire are relatively movable in a single horizontal plane to maintain the axis of the wire at a fixed point irrespective of its diameter. The rotatable elements include a yoke structure extending forwardly of the blades and holding a bushing through which the wire is inserted closely adjacent the blades to provide an accurate guide and centering device for the wire.

22 Claims, 6 Drawing Sheets

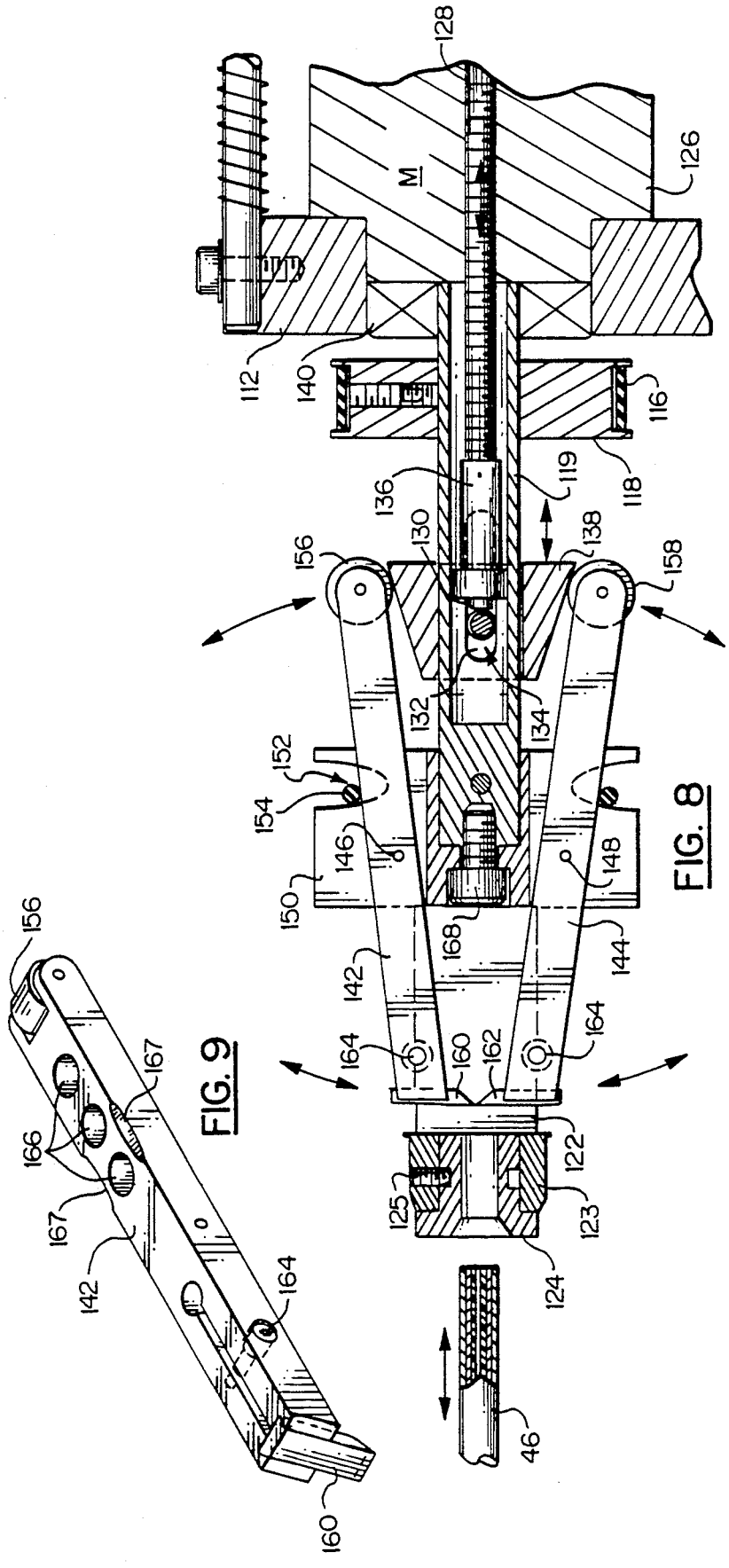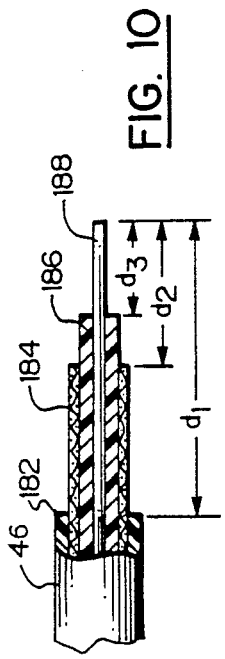

AUTOMATED WIRE INSULATION CUTTER AND STRIPPER

BACKGROUND OF THE INVENTION

The present invention relates to apparatus for cutting one or more layers of insulation or other materials surrounding a wire or cable and selectively stripping such insulation off the wire. More specifically, the invention relates to insulation cutting and stripping apparatus of the rotary blade type which is digitally programmed and controlled.

The prior art includes various forms of rotary blade wire insulation cutters and strippers, including that of U.S. Pat. No. 4,745,828, and other patents discussed therein, wherein the conductor is inserted linearly against a stop and gripped between a pair of movable jaws. A pair of cutting blades mounted at one end of respective pivot arms are moved away from and toward one another by advancing and retracting a cone between the ends of the arms opposite the blades. The stop which is contacted by the end of the wire to be stripped is on the opposite side of the blades from the gripping jaws, whereby the blades must be open (apart) as the wire is inserted and the respective positions of the stop and the blades must be precisely controlled. One of the objects of the present invention is to provide a rotary blade wire insulation cutter and stripper wherein the blades are closed (i.e., their cutting edges are together) as the wire is inserted, and the blades themselves provide the stop for wire insertion.

The pivot arms and the cone by which they are pivotally moved are mounted upon a carriage and are jointly movable in a direction along the wire axis by a preselected distance to establish the desired length from the end of the wire to the cut. The cone is then moved linearly as the assembly is rotated, causing the arms to pivot and the blades to move towards one another to establish the desired depth of the cut. In the prior art apparatus, such movements are monitored by potentiometers, and controlled by the resulting analog signal. Another object of the present invention is to provide entirely digital means for controlling movement of the elements to establish both the length and the depth of cuts made by the blades.

The jaws which grip the wire as it is cut are moved in an accurate path toward and away from the wire in the prior art apparatus, which may result in inaccurate centering as wires of differing diameters are gripped by the jaws. Furthermore, the jaws provide the sole means of support for the wire. Additional objects of the present invention are to provide automated wire cutting and stripping apparatus with improved wire gripping, centering and support means.

In a more general sense, the object of the invention is to provide novel and improved, fully automated cutting and stripping apparatus for wire coverings which is compact, durable, efficient, versatile and highly accurate.

Other objects will in part be obvious and will in part appear hereinafter.

SUMMARY OF THE INVENTION

In the preferred embodiment, the apparatus of the invention is mounted upon a rigid framework within a casing of dimensions suitable for table-top support, and having controls including a keyboard and visual display on a front surface thereof. A hinged guard on the casing has an opening to provide access to the position where the wire to be operated upon is inserted. A pair of opposed gripper jaws are mounted for movement toward and away from one another by rotatable members having off-center pins connected to the jaws. A motor drives a pair of spur gears which are mounted on the rotatable members, and the increased current drawn by the motor when resistance to further movement of the jaws is encountered as the wire is gripped thereby provides a control signal to decrease power to the motor to avoid excessive gripping force on the wire.

A pair of arms are pivotally mounted at points intermediate of their ends on opposite sides of a rotor. The cutting blades are mounted on one end of each arm and the opposite ends carry a roller. The arms are biased by an O-ring spring toward rotation in a direction moving the blades away from one another, such rotation being limited by contact of the rollers with a cone-shaped member. This member is rotatable, together with the rotor and pivot arms, and is separately movable along the axis of rotation in one direction to cause the arms to pivot against the spring bias, moving the blades toward one another, and in the opposite direction to allow the arms to pivot under the spring bias, moving the blades away from one another. The rollers on the opposite ends of the pivot arms ride on the surface of the cone as it moves along the axis of rotation.

A cylindrical casing surrounding the rotor includes an integral yoke structure extending toward the wire gripping jaws and having a central portion positioned between the jaws and the cutter blades. Before operation of the apparatus is initiated, the blades are positioned with their cutting edges in contact, and the wire to be operated upon is manually advanced between the open gripper jaws and through an opening in a bushing mounted in the central portion of the yoke until the end of the wire abuts the closed blades. The bushing thus provides a wire guide and centering means closely adjacent the blades, and the blades themselves provide the wire stop.

Upon actuation of the apparatus, the gripper jaws move together, firmly holding the wire in a centered position, the cone moves to pivot the arms and move the blades apart, and the rotor, arms and cone are moved upon a carriage along the common axis of the wire and the rotor. The distance travelled by the carriage corresponds to the length of the cut, i.e., the distance from the end of the wire at which the cut is to be made, this dimension having previously been entered in the memory of a microprocessor via the aforementioned keyboard. The rotary drive motor is then started, rotating the blades (together with the pivot arms, rotor and cone) about the axis of the wire as the cone is moved to cause the arms to pivot in a direction moving the blades toward one another. The extent of this movement, which determines the depth of cut, is also controlled by keyboard input to the microprocessor.

A further programming input to the microprocessor indicates whether the insulation or other material which has been cut is to be stripped from the wire. If the material is to be removed, the carriage is moved away from the wire when cutting is complete and rotation of the blades is stopped. If it is not to be removed, the cone is again moved to allow the arms to pivot under spring bias, and moving the blades apart before the carriage is moved. The microprocessor may be programmed to perform a number of cutting operations, with or without partial or complete stripping, with different lengths and depths of cuts, on a plurality of layers of material covering a single conductor.

The carriage and cone, which are moved to control the length and depth, respectively, of the cuts, are moved by linear actuators under control of digital logic by the microprocessor, greatly enhancing the accuracy of the cuts. The mounting and drive means is such that a first linear actuator is mounted upon the carriage, together with the rotor, yoke, pivot arms and cone, and rotates a nut to move the carriage and elements mounted thereon along a fixed lead screw. A second linear actuator advances and retracts a second lead screw to move the cone, relative to the rotor. A mechanical limit switch on the frame is contacted by the carriage to stop its movement at the rear limit of its travel, while an optical (IR) switch performs this function for the cone travel.

The foregoing and other features of construction and operation of the automated wire insulation cutting and stripping apparatus of the invention will be more readily appreciated from the following detailed description, taken in conjunction with the accompanying drawings, the several Figures of which will now be described.

BRIEF DESCRIPTION OF THE DRAWINGS

FIG. 8 is a fragmentary, sectional, side elevational view of portions of the apparatus;

FIG. 9 is a perspective view of one of the elements of the apparatus;

FIG. 10 is a fragmentary, sectional view of a typical piece of wire of the type operated upon by the apparatus;

DETAILED DESCRIPTION

Figure 1:
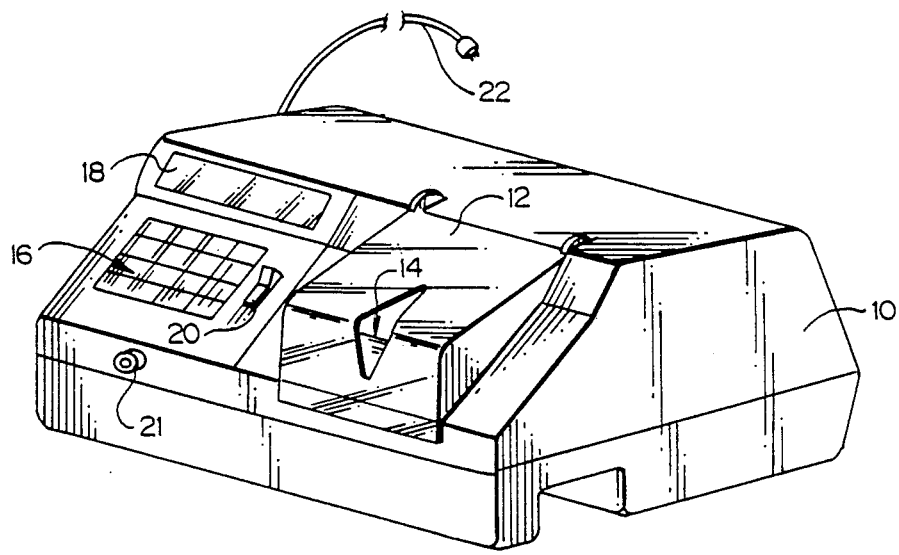
FIG. 1 is a perspective view of the apparatus in completely assembled form, all other views being shown without the outer, protective casing.

Referring now to the drawings, in FIG. 1 is shown a preferred form of the wire insulation cutting and stripping apparatus of the invention, the operating parts of which are enclosed by protective casing 10. Hinged guard 12, having opening 14, is mounted on the front side of casing 10 and provides access to the wire insertion location. Keyboard 16 and visual display 18 are likewise mounted on the front side of casing 10, for purposes described later, as are power switch 20 and start switch 21. The apparatus is connected to a source of electrical power by cord and plug 22. The mechanical elements shown in the other Figures are housed within the right-hand side of casing 10, as viewed from the front, and the microprocessor and other electronic elements are mounted in the left side.

The apparatus is mounted upon a rigid framework generally consisting of forward and rear frame members 24 and 26, respectively, and guide bars 28 and 30 extending therebetween. A carriage structure, supporting a number of elements described later for movement relative to the fixed frame, includes support members 32 and 34 on one side slidably encircling guide bar 28, and support members 36 and 38 mounted on guide bar 30 on the other side. The carriage is reciprocally driven along guide bars 28 and 30 by linear actuator 40, fixedly attached to mounting member 42 and rotatably driving a nut (not shown) threaded on fixed lead screw 44 which extends forwardly from frame member 26. Linear actuator 40, together with mounting member 42 and other portions of the carriage structure, moves in forward and rear directions upon the rigid framework in response to actuation by electrical power of proper polarity. Power is shut off to stop rearward movement by contact of a portion of mounting member 42 with fixed limit switch 45 at the extreme rear limit of carriage travel.

Figure 4:
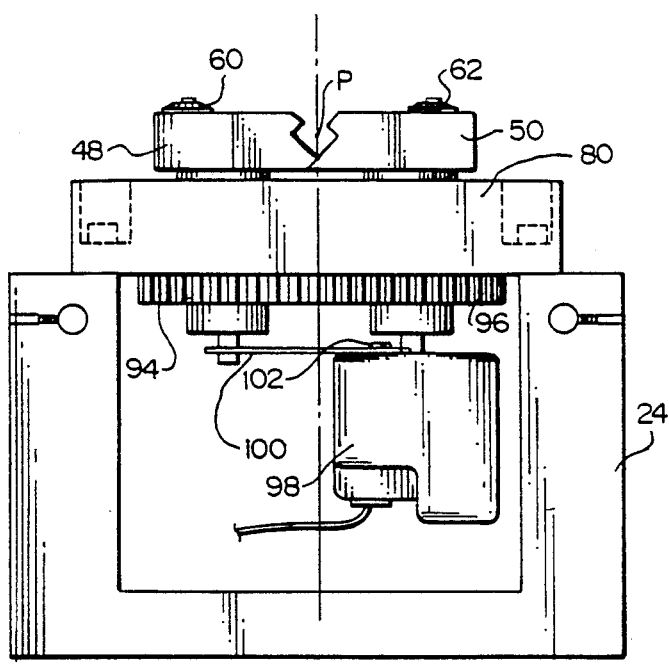
FIG. 4 is a front end elevational view.

The wire 46 being acted upon is held in a fixed position as the carriage structure and elements mounted thereon are moved relative to the wire. Reciprocally movable gripping jaws 48 and 50 each include a plurality of V-notched, interleaved arms extending toward one another from solid blocks having openings 52 and 54, respectively, therein. Pins 56 and 58 extend rotatably through openings 52 and 54, respectively, and are secured at their upper ends by gripping washers 60 and 62. Shafts 64 and 66 are concentrically affixed to discs 68 and 70, respectively, from which pins 56 and 58 extend at off-center, or eccentric, positions. Shafts 64 and 66 are affixed in cylindrical members 72 and 74, respectively, which are rotatably mounted in openings 76 and 78 in block 80. Screws 82 and 84 extend through elongated openings 86 and 88, respectively, in block 80 to threaded openings 90 and 92, respectively, in frame member 24. Cylindrical members 72 and 74 are respectively connected at their lower ends to spur gears 94 and 96, the latter of which is mounted upon and driven by reversible motor 98. Plate 100 is anchored at two points to motor 98 by screws 102 and 104, and at one point 106 to gear 94, which meshes with gear 96, thus stabilizing motor 98 against self-rotation. Thus, as motor 98 is operated to rotate gears 94 and 96 in either direction, gripping jaws 48 and 50 move toward and away from one another due to the eccentric rotation of pins 56 and 58. Since the gripping jaws remain in a fixed horizontal plane as they move, rather than being pivotally movable about horizontal axes, the axis of a wire gripped between the V-notches will always be at the same location, indicated in FIG. 4 as point P, regardless of the wire diameter.

Motor 110 is supported at its forward end upon mounting member 112 of the carriage structure, and is adapted to drive pulley 114 in a single direction. Pulley 114 is connected by belt 116 to pulley 118, which rotates hollow shaft 119 (FIG. 8). Yoke structure 122 extends from casing 120 and includes a forward end portion 123 in which bushing 124 is removably secured by set screw 125. Linear actuator 126 is mounted upon the carriage structure and drives lead screw 128 in forward and rear directions with respect to both the carriage and fixed frame structures. As seen in FIG. 8, the forward end 130 of shaft 136, attached to lead screw 128, abuts cross pin 132 which extends through elongated slot 134 in shaft 119. Pin 132 is affixed at each end to cone-shaped element 138 which is axially slidable on shaft 119. Lead screw 128 and shaft 136 extend loosely through shaft; cone-shaped element 138 is affixed to shaft 119 by cross pin 132 for rotation therewith, whereby rotation of pulley 118 rotates shaft 119 and element 138, but not lead screw 128. The rear end of shaft 119 is press fitted in bearing 140 which is mounted in a pocket in mounting member 112 of the carriage structure.

Pivot arms 142 and 144 are mounted for rotation about pins 146 and 148, respectively, in cyclindrical rather 150, having slots in which the arms are positioned and peripheral groove 152 for elastic O-ring 154. Arms 142 and 144 carry rollers 156 and 158, respectively, at one end of each and cutter blades 160 and 162 at the other ends. As shown in FIG. 9, the blades are held between split, forward portions of the pivot arms which grip the blades by tightening screws 164 to draw the split portions together. As also seen in FIG. 9, openings 166 extend through the arms between the pivot points and the ends carrying the rollers, and the sharp edges are broken at 167, for purposes described later.

O-ring 154 biases pivot arms 142 and 144 toward rotation about pins 146 and 148 in a direction which keeps rollers 156 and 158 firmly in contact with the surface of cone-shaped element 138 as it is moved in the forward and rear directions along shaft 119. Element 138 is shown in FIG. 8 at the forward limit of its travel, wherein the cutting edges of blades 160 and 162 are in contact with one another. As element 138 is moved rearwardly, rollers 156 and 158 ride on the surface thereof as the ends of the pivot arms carrying blades 160 and 162 move apart under the bias of O-ring 154. The distance by which the blades are separated is thus seen to be a function of the position of element 138. Also, the bias of O-ring 154, urging rollers 156 and 158 into contact with the tapered surface of element 138 maintains cross pin 132 in contact with forward end 130 of shaft 136. Rotor 150 is affixed by screw 168 to shaft 119. Casing 120 is frictionally engaged by a snug fit with the outer surface of rotor 150, but is not otherwise affixed thereto.

Lead screw 128 is clamped firmly in an opening in bar 170, which is movable in the forward and rear directions with screw 128 and prevents rotation thereof. Rod 172 is affixed at its forward end to mounting member 112 and extends loosely through an opening in the upper part of bar 170, which is biased in the rearward direction by spring 174, tending to prevent up and down movement. Pin 176 extends downwardly from the lower end of bar 170 into guide slot 178 in mounting member 42. The rearward limit of travel of lead screw 128 is controlled by entry of the end of the screw into optical (IR) switch 180.

In operation, power switch 20 is placed in the "on" position and instructions for the job to be performed are entered in the microprocessor through the keyboard interface. For example, with reference to wire 46 of FIG. 10, a first cut may be made through outer layer 182 at a distance $d_1$ from the end of the wire to a depth equal to the thickness of layer 182. The cut-off end portion of layer 182 may then be stripped off the wire, and a second cut made through intermediate layer 184 at a distance $d_2$ from the end of the wire to the depth of layer 184, which may then be stripped from the wire. A third cut may then be made through inner layer 186 at a distance $d_3$ from the end of the wire to the depth of conductor 188. Thus, the instructions entered by the operator include a sequence of instructions for the length and depth of one or more cuts, as well as whether or not the layer is to be stripped off the wire after it has been cut. The instructions may be reviewed on visual display 18 and edited as desired through manipulation of appropriate keyboard buttons.

When the instructions have been completed, the "enter" button on keyboard 16 is pressed, whereupon linear actuators 40 and 126 are actuated to bring the elements to their starting positions, i.e., with blades 160 and 162 closed (element 138 at its forward limit of travel) and the carriage positioned in accordance with the length of the first cut to be made. The wire is then inserted through opening 14 in guard 12, passing between open gripping jaws 48 and 50, through bushing 124, which serves to guide and center the wire, until the end of the wire abuts closed cutter blades 160 and 162. The operator then presses start button 21. Motor 98 (12 v DC) is thereby actuated to move gripping jaws 48 and 50 together until wire 46 is gripped firmly therebetween, at which time the increased current draw by the motor is sensed and used as a control signal to reduce power to the motor so that it exerts only the required holding power and does not damage the wire.

Linear actuator 126 is then actuated to move lead screw 128 and thus element 138 rearwardly until the end of the screw actuates switch 180, moving blades 160 and 162 apart. Linear actuator 40 is then actuated, moving itself and the carriage structure forward by a distance equal to the length (i.e., the distance from the end of the wire) of the first cut. Motor 110 (24 v DC) is actuated to drive pulleys 114 and 118, thereby rotating shaft 119, element 138, rotor 150, pivot arms 142 and 144 and their associated blades, and casing 120 with yoke 122 and bushing 124 at a speed of, e.g., 1,500 to 1,700 rpm. As the elements are rotating, linear actuator 126 is again actuated to move lead screw 128 forwardly, closing blades 160 and 162 to cut the outer covering of wire 46. Actuator 126 is deactuated to stop movement of lead screw 128 and element 138, and motor 110 is deactuated to stop rotation when the pre-programmed depth of cut is reached. If the outer layer is to be stripped from the wire, actuator 110 is again actuated to move the carriage rearwardly until contact with limit switch 45 again deactuates actuator 110.

The sequence of movements of the elements continues in the same manner until all instructions previously entered are completed, at which time motor 98 is actuated to open gripping jaws 48 and 50 to release wire 46. Accuracy is greatly enhanced by the use of linear actuators 110 and 126 to control the length and depth of cuts, as opposed to analog, position feedback systems. The linear actuators are digitally controlled to move the carriage structure and the cutter blades a discrete number of "counts" or pulses from reference positions. Since the depth of cut is more critical than the length, an optical type switch is used to establish the reference position for lead screw 128, while using a less expensive, physical contact switch to establish the carriage reference position. Accuracy (repeatability) on the order of 0.001" can be expected for length of cut, and 0.001" for depth of cut by use of the disclosed system.

Figure 11:
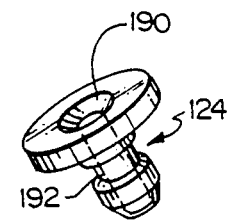
FIG. 11 is a perspective view of an element of the apparatus.
Figure 12:
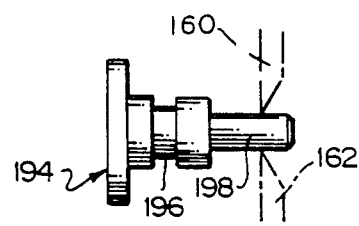
FIG. 12 is a side elevational view of an element used to calibrate the cutter blades, with the blades shown in phantom lines.
Figure 2:
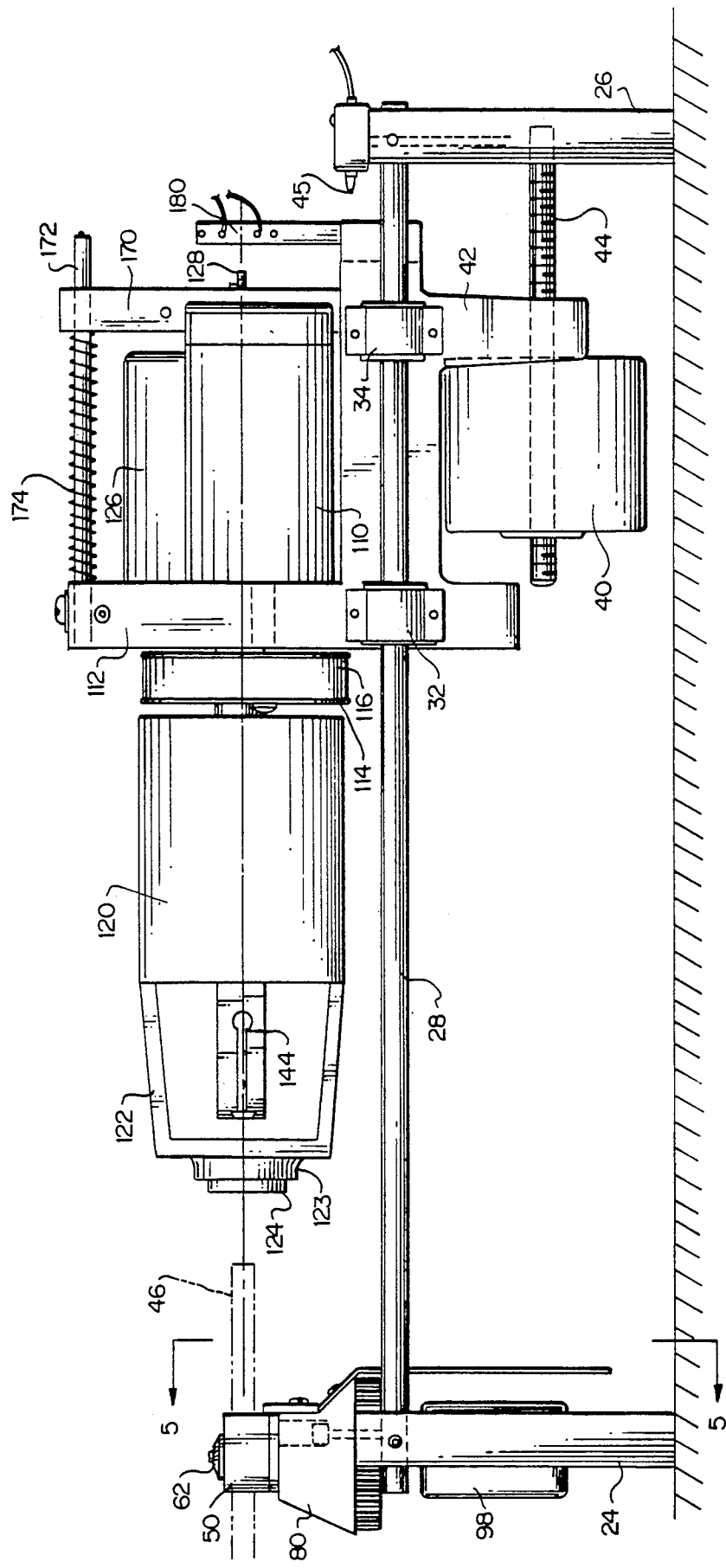
FIG. 2 is a side elevational view of the complete mechanical assembly.
Figure 3:
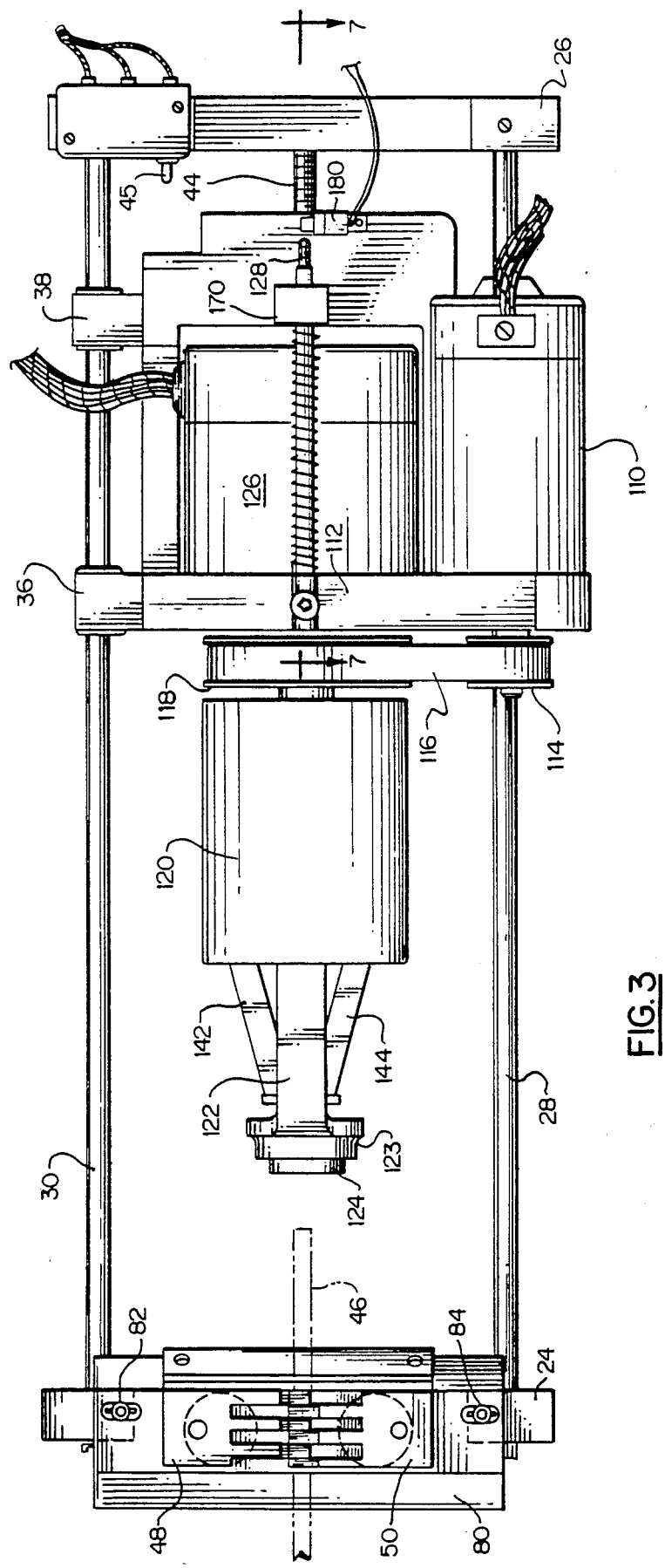
FIG. 3 is a top plan view thereof.
Figure 7:
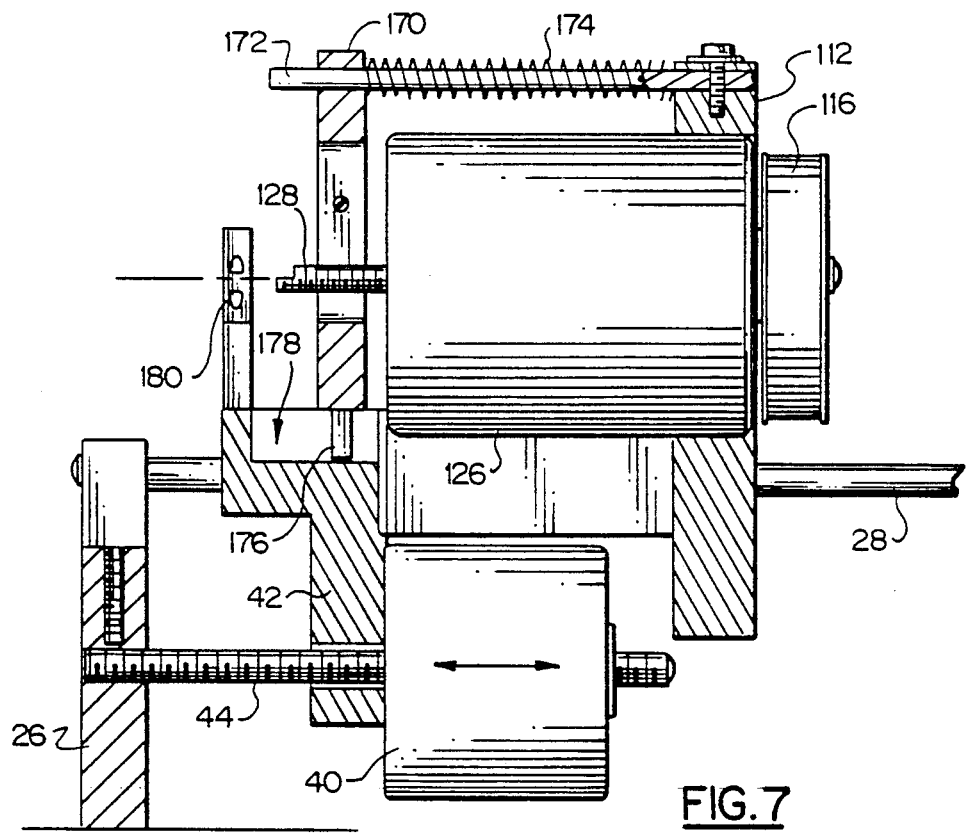
FIG. 7 is an elevational view in section on the line 7—7 of FIG. 3.
Figure 5:
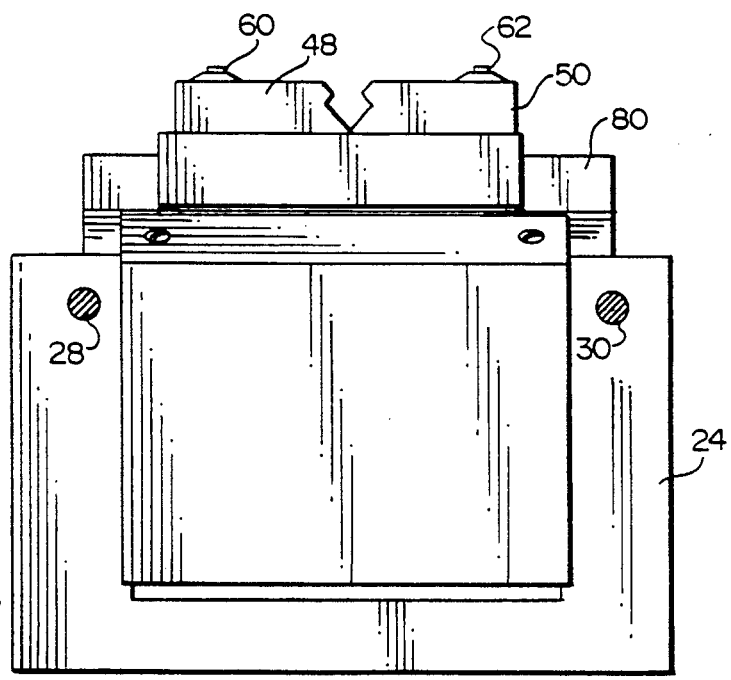
FIG. 5 is an end elevational view in section on the line 5—5 of FIG. 2.
Figure 6:
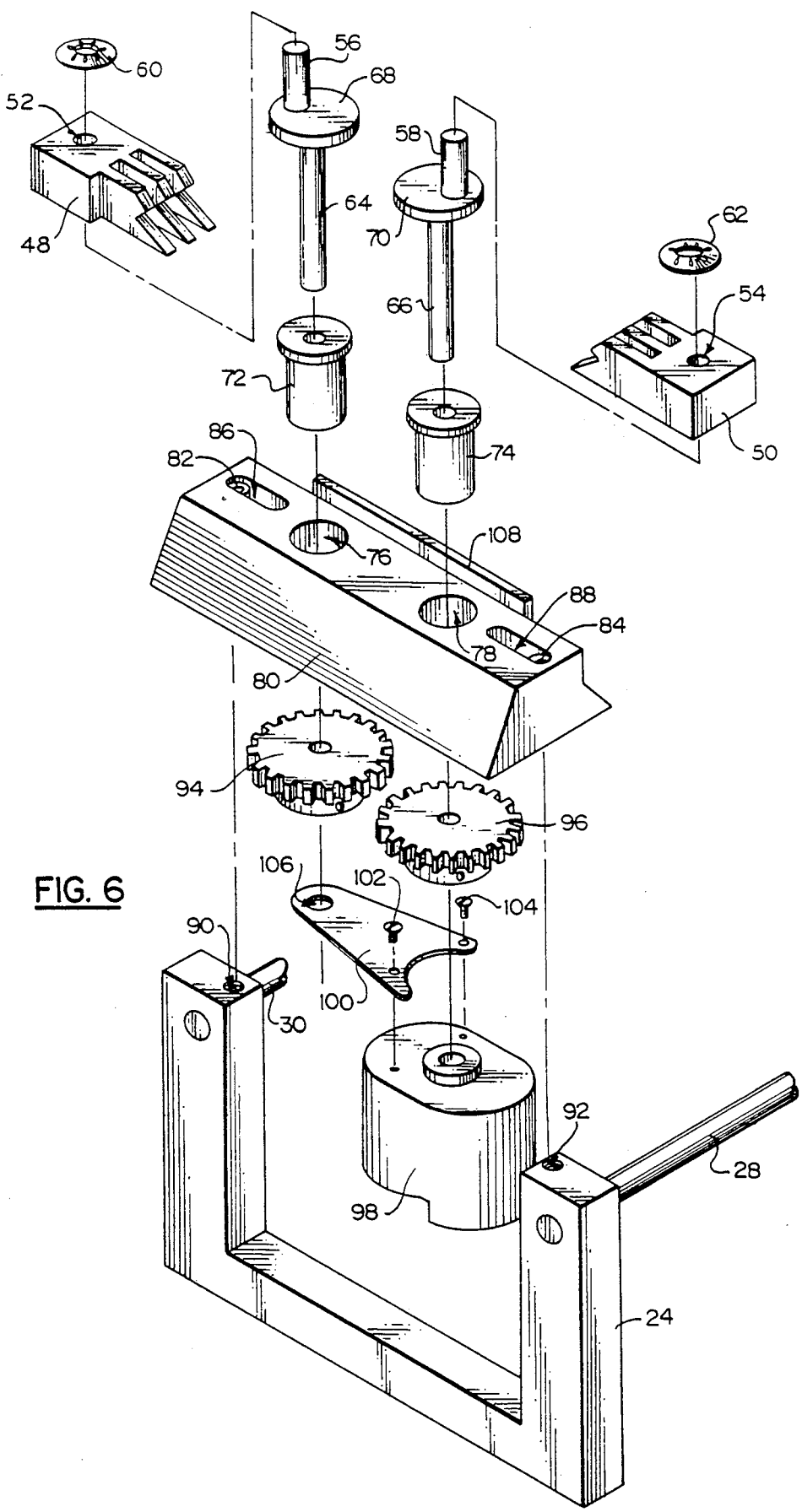
FIG. 6 is an exploded, perspective view of certain elements of the apparatus.

Bushing 124 is shown in a preferred embodiment in FIG. 11. Tapered section 190 at the entrance to the through opening provides a guide for insertion of the end of the wire, and reduced diameter portion 192 permits the bushing to be firmly secured by set screw 125. For initial positioning of the cutting blades, as when blades are replaced, bushing 124 is removed and replaced by plug 194, shown in FIG. 12. Plug 194 also has a reduced diameter portion 196 for engagement by set screw 125, as well as a precision ground pin 198 extending through the plane of blades 160 and 162. With the cutter blades removed or loosely carried in the forward ends of pivot arms 142 and 144, the machine is programmed to move lead screw 128 and element 138 to the positions they would have for a blade spacing equal to the diameter of pin 198, e.g., 0.2500". The blades are then positioned with their cutting edges in contact with pin 198, as shown in FIG. 12, and screws 164 are tightened. Plug 194 is then removed from forward portion 123 of yoke 122 and replaced by bushing 124.

Holes 166 decrease the weight of arms 142 and 144 between the pivot points and rollers 156 and 158, whereby centrifugal force during rotation of the arms, together with the other rotor structure, assists in urging the rollers into firm engagement with the surface of cone-shaped element 138. Broken edges 167 in the area of peripheral groove 152 help to insure that O-ring 154 is not cut or damaged by contact with the arms. The surface of element 138 acts as a cam, with rollers 156 and 158 acting as followers in the pivoting movement of arms 142 and 144.

What is claimed is:

1. Apparatus for cutting through a cylindrical layer of material on a wire to a desired depth and at a desired distance from a terminal end of the wire, said apparatus comprising:
   (a) a pair of cutter blades having linear, parallel cutting edges;
   (b) means for moving said blades relative to one another between a first position wherein said cutting edges are substantially in mutual contact and a second position wherein said edges are equally spaced from a fixed, linear axis perpendicular to and passing between said edges;
   (c) a bushing having an opening therethrough for passage of said wire at a position adjacent said blades, the center of said opening lying upon said axis;
   (d) a pair of reciprocally movable gripping jaws positioned on the side of said bushing opposite said blades and each having a gripping surface for releasable engagement of said wire;
   (e) means for moving said jaws while maintaining said gripping surfaces symmetrically arranged on opposite sides of said axis between a spaced position and a gripping position of said gripping surfaces with respect to a wire extending therebetween;
   (f) operating means for sequentially positioning said blades in said first position and said jaws in said spaced position, whereby said wire may be extended axially between said gripping surfaces and through said bushing opening to abut said terminal end against said blades, and then moving said gripping surfaces to said gripping position and said blades to said second position, preparatory to making a cut through said layer;
   (g) a shaft, rotatable about said axis, to which said blades and said bushing are commonly connected; and
   (h) a first motor for imparting rotation to said shaft, and thereby to said bushing and blades, while moving said blades between said first and second positions.

2. The apparatus of claim 1 and further including mounting means for said gripping jaws which maintain the path of movement thereof in a single plane parallel to said axis.

3. The apparatus of claim 1 wherein said means for moving said gripping jaws comprises a second motor.

4. The apparatus of claim 1 wherein said means for moving said blades between said first and second positions include a first linear actuator.

5. The apparatus of claim 4 and further comprising means including a second linear actuator for moving said blades in a direction parallel to said axis.

6. The apparatus of claim 5 wherein said means for moving said blades between said first and second positions further includes a first lead screw, and said means for moving said blades parallel to said axis further includes a second lead screw.

7. The apparatus of claim 6 wherein said first lead screw is moved relative to said blades in a direction parallel to said axis by said first linear actuator.

8. The apparatus of claim 7 and further including means restraining said first lead screw against rotation as it is moved relative to said blades.

9. The apparatus of claim 6 wherein said second lead screw is stationary.

10. A rotary blade wire insulation cutter and stripper comprising:
    (a) a fixed frame having forward and rear ends;
    (b) reciprocally movable gripper jaws mounted upon said frame forward end for releasably holding the wire in a fixed position extending along a predetermined axis;
    (c) a carriage structure mounted for reciprocal, linear movement parallel to said axis between said frame forward and rear ends;
    (d) a rotor structure mounted upon said carriage structure for movement therewith and rotatable about said axis;
    (e) said rotor structure including a cylindrical member having a pair of radial slots extending from end to end on opposite sides thereof and a peripheral groove extending into said cylindrical member about the external circumference thereof;
    (f) a pair of arms respectively mounted within said slots for movement relative to said cylindrical member about pivot points equally spaced from said axis and intermediate of forward and rear ends of said arms;
    (g) a pair of cutter blades respectively mounted upon said forward ends of said arms;
    (h) a pair of follower elements respectively mounted upon said rear ends of said arms;
    (i) a cone-shaped element mounted upon said rotor structure and movable along said axis relative to said cylindrical member in contact with said follower elements to rotate said arms about said pivot points, thereby moving said blades relative to one another on opposite sides of said axis; and
    (j) a spring member positioned in said peripheral groove and contacting said arms between said pivot points and said rear ends thereof to urge said follower elements into contact with said cone-shaped element.

11. The invention according to claim 10 wherein said spring member comprises an elastic O-ring.

12. The invention according to claim 10 wherein said rotor structure further includes a hollow shaft to which said cylindrical member is fixedly attached and along which said cone-shaped element is axially movable.

13. The invention according to claim 12 and further including a first, stationary lead screw for movement of said carriage structure and a second lead screw extending into said hollow shaft for movement of said cone-shaped element.

14. The invention according to claim 13 and further including an axially elongated slot in opposite sides of said hollow shaft and a cross pin extending through said slot and having end portions fixed in said cone-shaped element.

15. The invention according to claim 14 wherein said follower elements urge said cone-shaped element toward axial movement along said hollow shaft in a direction maintaining contact of said cross pin with said second lead screw.

16. In a rotary blade wire insulation cutter and stripper having a pair of cutter blades mounted for controlled movement with respect to a stationary wire in a first direction axially of said wire to establish a length of cut from a terminal end of said wire, and in a second direction radially of said wire to establish a depth of cut inwardly from the surface of said wire, means for controlling the amount of movement of said blade in said first and second directions from respective reference positions, said controlling means comprising:
 (a) a first, stationary lead screw and a second lead screw;
 (b) a first linear actuator operatively engaged with said first lead screw for movement of said blades in said first direction in response to digital signals supplied to said first linear actuator;
 (c) a second linear actuator operatively engaged with said second lead screw for movement of said blades in said second direction in response to digital signals supplied to said second linear actuator; and
 (d) means for rotating said blades about the axis of said wire.

17. The invention according to claim 16 wherein said second lead screw is movable axially with respect to said blades.

18. The invention according to claim 16 and further including a pair of first and second limit switches establishing said reference positions for movement of said blades in said first and second directions, respectively.

19. The invention according to claim 18 wherein said first limit switch comprises a mechanical contact switch.

20. The invention according to claim 18 wherein said second limit switch comprises an optical switch actuated in response to the position of said second lead screw.

21. In a wire insulation cutter and stripper having one or more cutter blades radially movable with respect to and rotatable about a fixed axis, gripping means for firmly engaging and holding a wire upon said fixed axis as said blades are moved to cut and strip said insulation, said gripping means comprising:
 (a) fixed frame means;
 (b) a pair of gripping jaws having respective gripping surfaces equally spaced on opposite sides of said fixed axis;
 (c) movable support means connecting each of said gripping jaws to said frame means;
 (d) reversible motor means for moving said support means to move said gripping jaws and surface reciprocally toward and away from one another between positions spaced from and engaged with a wire positioned coaxially with said fixed axis; and
 (e) said support means comprising a pair or rotatable members mounted upon said frame means for rotation by said reversible motor means in opposite directions about spaced, parallel, rotation axes perpendicular to said fixed axis, said rotatable members being respectively connected to said gripping jaws by pins having respective pin axes spaced from and parallel to said rotation axes.

22. The invention according to claim 21 and further including a pair of spur gears timed to respective ones of said rotatable members and rotatable about said rotation axes in response to actuation of said motor means.

* * * * *